US010346783B2

(12) United States Patent
Murugesan et al.

(10) Patent No.: US 10,346,783 B2
(45) Date of Patent: Jul. 9, 2019

(54) ELECTROCHEMICAL METHODS OF REMOVING DISSOLVED OXYGEN FROM DRILLING OR COMPLETION FLUIDS

(71) Applicants: Sankaran Murugesan, Katy, TX (US); Valery Khabashesku, Houston, TX (US); Qusai Darugar, Houston, TX (US)

(72) Inventors: Sankaran Murugesan, Katy, TX (US); Valery Khabashesku, Houston, TX (US); Qusai Darugar, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 15/704,573

(22) Filed: Sep. 14, 2017

(65) Prior Publication Data

US 2019/0078404 A1 Mar. 14, 2019

(51) Int. Cl.
*E21B 41/02* (2006.01)
*G06Q 10/06* (2012.01)

(52) U.S. Cl.
CPC ..... *G06Q 10/06375* (2013.01); *G06Q 10/067* (2013.01)

(58) Field of Classification Search
None
See application file for complete search history.

(56) References Cited

U.S. PATENT DOCUMENTS 4,594,170 A * 6/1986 Brown ..................... C09K 8/05 166/300
8,778,264 B2 7/2014 McClung et al.
9,145,511 B2 9/2015 McCubbins et al.
9,371,479 B2 6/2016 Mirakyan et al.
2008/0119375 A1 5/2008 Barmatov et al.
2009/0060801 A1 3/2009 Hughes et al.
2010/0230366 A1 9/2010 Bigeonneau et al.
2011/0294044 A1* 12/2011 Artero ................ C02F 1/46109 429/530
2013/0020079 A1* 1/2013 Hopkins .............. C02F 1/4618 166/268

(Continued)

FOREIGN PATENT DOCUMENTS

EP 1580252 A1 9/2005
WO 2009028973 A1 3/2009

OTHER PUBLICATIONS

Avalos, et al. "Cytotoxicity and ROS production of manufactured silver nanoparticles of different sizes in hepatoma and leukemia cells", J. Appl. Toxicol. 2014; 34: 413-423.

(Continued)

*Primary Examiner* — Andrew Sue-Ako
(74) *Attorney, Agent, or Firm* — Cantor Colburn LLP

(57) ABSTRACT

A method of treating a fluid in a subterranean formation comprises injecting a fluid into the subterranean formation, the fluid containing dissolved oxygen; contacting the fluid with an oxygen removal device, the oxygen removal device comprising an anode, a cathode comprising metallic nanoparticles loaded on a support, an ion exchange membrane disposed between, and electrically separating the anode and the cathode, and a power source electrically coupled to the anode and the cathode; and reducing the amount of the dissolved oxygen in the fluid.

20 Claims, 3 Drawing Sheets

Fluid flows in
150
100
150
200
Fluid flows out

(56) References Cited

U.S. PATENT DOCUMENTS

| | | | | |
|---|---|---|---|---|
| 2014/0002089 | A1* | 1/2014 | Wood | G01V 3/20 324/366 |
| 2014/0072653 | A1* | 3/2014 | Buschmann | A01N 37/16 424/613 |
| 2014/0220281 | A1 | 8/2014 | Black et al. | |
| 2015/0159072 | A1 | 6/2015 | Hale | |

OTHER PUBLICATIONS

Deville et al. "A New Oxygen Scavenger Suitable for High-Temperature Applications", AADE-11-NTCE-22 (2011) 8 pages.

Dotel et al. "Experimental Study of Silver Cathode for Electrochemical Deoxygenation of Seawater for Enhanced Oil Recovery", Ind. Eng. Chem. Res. 2016, 55, 8235-8242.

Fu, et al. "Mechanisms of nanotoxicity: Generation of reactive oxygen species", Journal of Food and Drug Analysis 22 (2014) 64-75.

Gupta, et al. "Oxygen reduction reaction on anisotropic silver nanoparticles in alkaline media", Chemical Physics Letters 680 (2017) 6-9.

He, et al. "Silver Nanoparticle-Reactive Oxygen Species Interactions: Application of a Charging-Discharging Model", J. Phys. Chem. C, 2011, 115; pp. 5461-5468.

Loza, et al. "The dissolution and biological effects of silver nanoparticles in biological media", Journal of Material Chemistry B, 2014, 2; pp. 1634-1643.

Shanmugan, et al. "Antimicrobial, free radical scavenging activities and catalytic oxidation of benzyl alcohol by nano-silver synthesized from the leaf extract of *Aristolochia indica* L.: a promenade towards sustainability", springerlink.com, published Jul. 15, 2015; 13 pages.

Sun, et al. "Graphene-Supported Silver Nanoparticles for pH-Neutral Electrocatalytic Oxygen Reduction", IEEE Transactions on Nanotechnology, vol. 13, No. 4, Jul. 2014; 6 pages.

Dotel, Utsav R. et al. "Experimental study of silver cathode for electrochemical deoxygenation of seawater for enhanced oil recovery." Industrial & Engineering Chemistry Research, Jul. 20, 2016, vol. 55, pp. 8235-8242.

Notification of Transmittal of the International Search Report and the Written Opinion of the International Searching Authority, or the Declaration; PCT/US2018/050809; dated Mar. 25, 2019; 11 pages.

Xin, Le et al. "Carbon supported Ag nanoparticles as high performance cathode catalyst for H2/O2 anion exchange membrane fuel cell." Frontiers in chemistry, Sep. 23, 2013, vol. 1, pp. 1-5.

* cited by examiner

ELECTROCHEMICAL METHODS OF REMOVING DISSOLVED OXYGEN FROM DRILLING OR COMPLETION FLUIDS

BACKGROUND

The presence of dissolved oxygen in drilling or completion fluids can increase corrosion or deterioration rate of drilling pipes and downhole equipment having metal surfaces. The rate of corrosion is affected by water and accelerated by electrolytes, such as those from salts present in drilling or completion fluids. One approach to reduce corrosion of metals in contact with dissolved oxygen is to "scavenge" the dissolved oxygen before it has a chance to oxidize the metal.

Mechanical deaeration can be used to reduce the level of dissolved oxygen in drilling or completion fluids. However, to ensure that the dissolved oxygen is at a sufficiently low level, chemical based oxygen scavengers are often required in many systems and processes.

Various oxygen scavengers have been developed. However, some known oxygen scavengers can decompose into potentially formation damaging compounds when used in high temperature environments. Others can be inactivated by heat. Still some oxygen scavengers may not be compatible with salts which are often encountered in a downhole environment. Thus, alternative means to remove or reduce dissolved oxygen in drilling and completion fluids are desired in the art.

BRIEF DESCRIPTION

A method of removing oxygen dissolved in a drilling or completion fluid comprises: flowing the drilling or completion fluid through an oxygen removal device comprising an anode, a cathode comprising metallic nanoparticles loaded on a support, an ion exchange membrane disposed between, and electrically separating the anode and the cathode, and a power source electrically coupled to the anode and the cathode.

A method of treating a fluid in a subterranean formation comprises injecting the fluid into the subterranean formation, the fluid comprising dissolved oxygen; contacting the fluid with an oxygen removal device, the oxygen removal device comprising an anode, a cathode comprising metallic nanoparticles loaded on a support, an ion exchange membrane disposed between, and electrically separating the anode and the cathode, and a power source electrically coupled to the anode and the cathode; and reducing the amount of the dissolved oxygen in the fluid.

BRIEF DESCRIPTION OF THE DRAWINGS

The following descriptions should not be considered limiting in any way. With reference to the accompanying drawings, like devices are numbered alike.

DETAILED DESCRIPTION

The inventors hereof have discovered an electrochemical process to remove dissolved oxygen in a fluid such as a drilling fluid or a completion fluid. The method comprises flowing the fluid through an oxygen removal device. The oxygen removal device comprises an anode, a cathode, an ion exchange membrane disposed between the anode and the cathode and configured to electrically separate the anode from the cathode, and a power source electrically coupled to the anode and the cathode. The oxygen removal device is disposed along a flow pathway of the fluid. The dissolved oxygen can be removed before the fluid is introduced into downhole. Alternatively the dissolved oxygen can be removed while the fluid is being introduced downhole or after the fluid is introduced downhole. In an embodiment, the oxygen removal device is disposed along a tubular, via which the fluid is introduced into a subterranean formation. The oxygen removal devices can be located on an inner surface or on an outer surface of the tubular. More than one oxygen removal devices can be used along the fluid flow pathway to increase the exposure between the oxygen removal device and the fluid. Optionally, in the event that the oxygen removal devices are located on an outer surface of the tubular, the cathode, the ion exchange membrane, and the anode are located inside a permeable housing to protect them from wall and debris during introduction and positioning within the wellbore.

Figure 1:
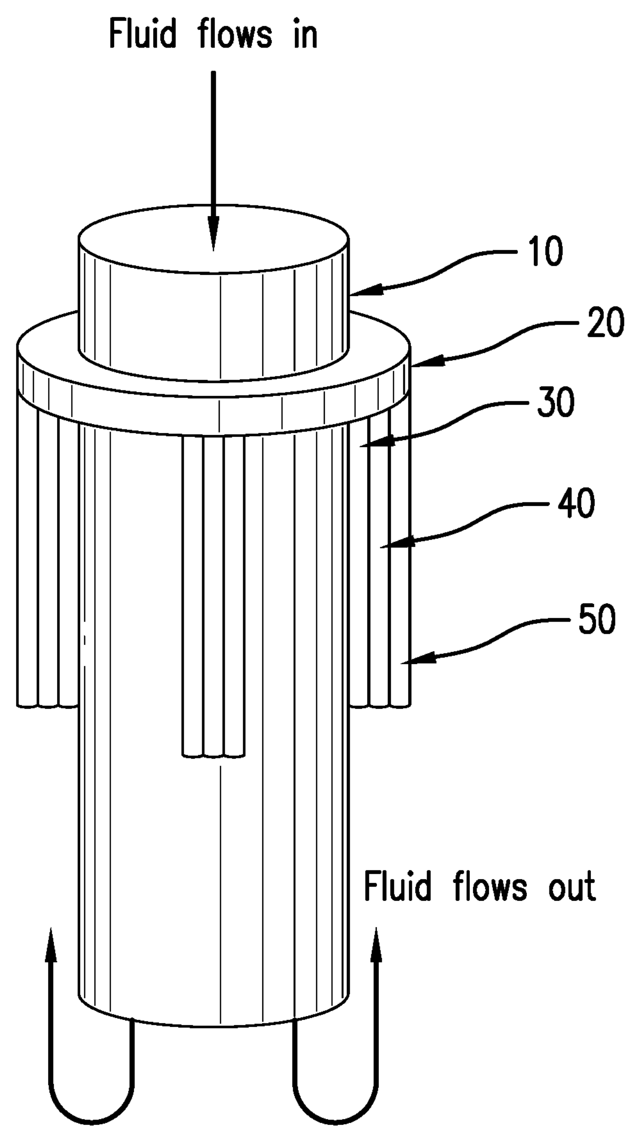
FIG. 1 illustrates a tubular having an exemplary oxygen removal device disposed on a surface of the tubular.

Referring to FIG. 1, an exemplary oxygen removal device includes a power source 20, an anode 30, a cathode 50, and an ion exchange membrane 40 disposed between anode 30 and cathode 50. The oxygen removal device is disposed on an outer surface of tubular 10. A fluid containing dissolved oxygen can be introduced into a subterranean formation via tubular 10. When the fluid flows out of the tubular 10 and comes into contact with the oxygen removal device, the dissolved oxygen in the fluid can be removed.

Figure 2:
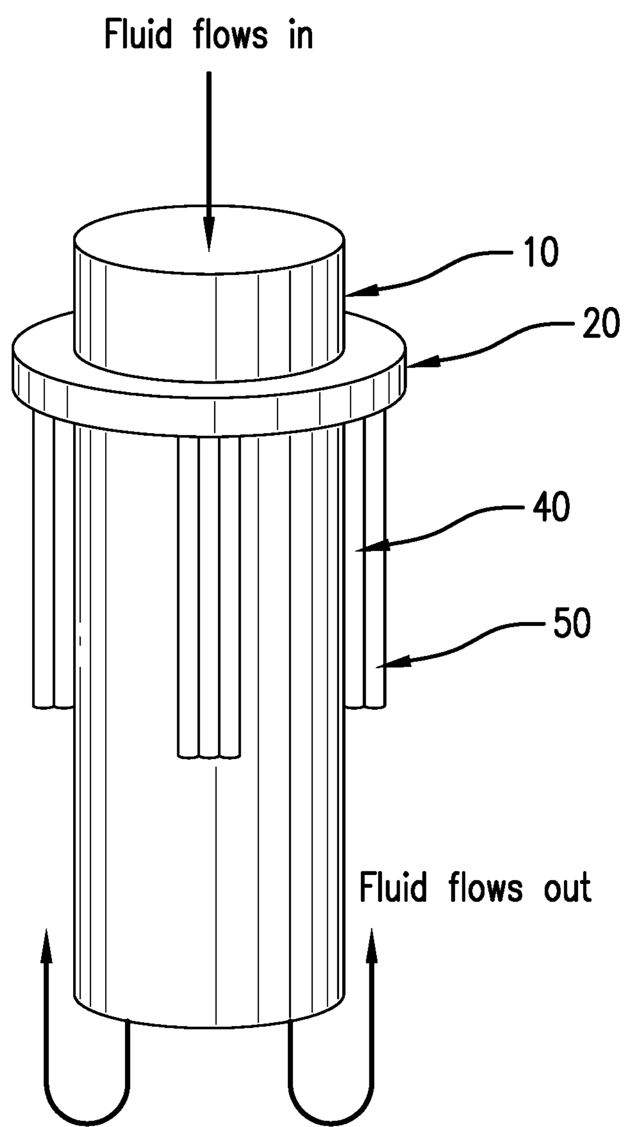
FIG. 2 illustrates a tubular having another exemplary oxygen removal device disposed on a surface of the tubular.
Figure 3:
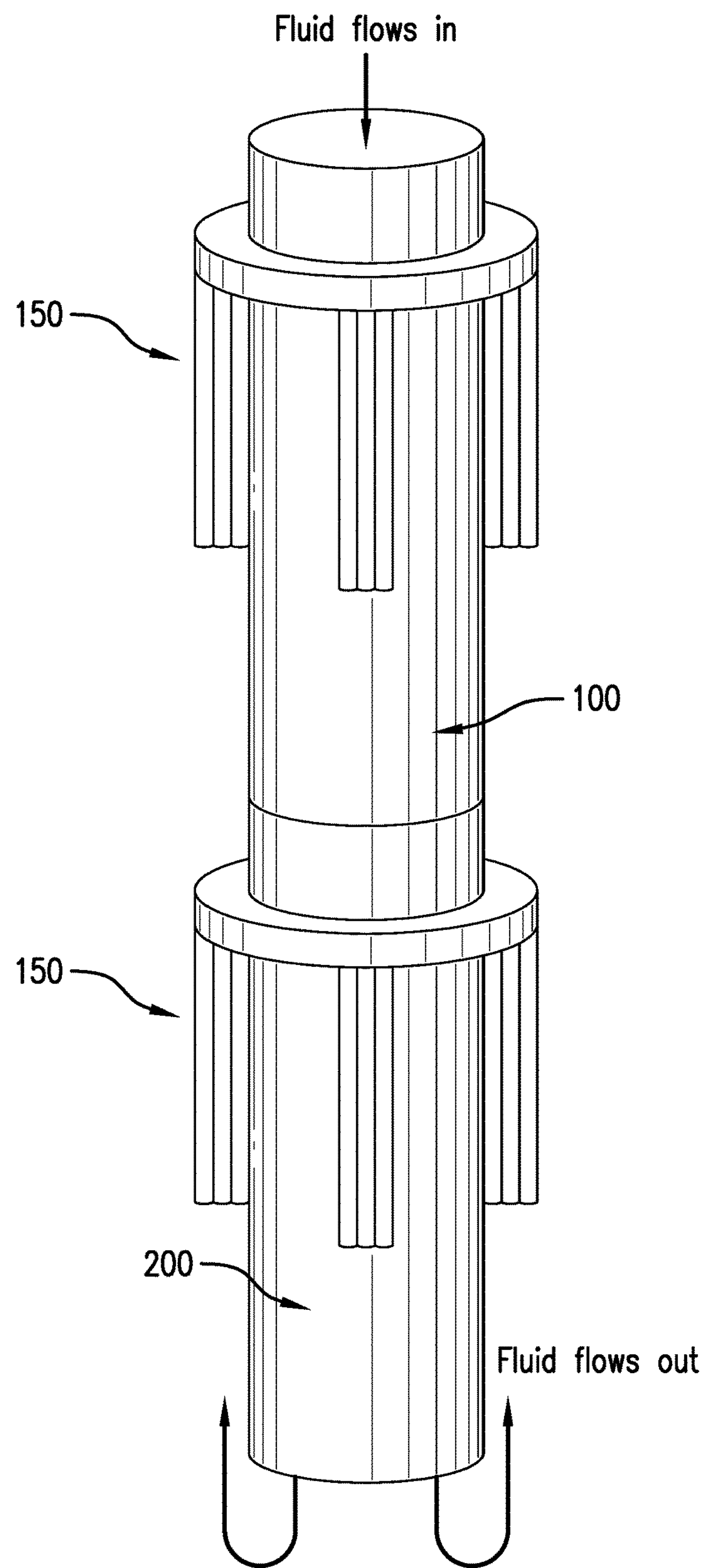
FIG. 3 illustrates a tubular having more than one exemplary oxygen removal devices disposed on a surface of the tubular.

In FIG. 2, the tubular 10 itself is used as the anode. In the embodiment illustrated in FIG. 2, no separate anode is used. FIG. 3 illustrates that more than one oxygen removal devices (150) can be disposed on different locations (100 and 200) of a tubular.

In an oxygen removal device, a cathode comprises metallic nanoparticles loaded on a support. The metallic nanoparticles include platinum, gold, copper, silver, tungsten carbide, titanium diboride, or a combination comprising at least one of the foregoing. Silver nanoparticles are specifically mentioned. The metallic nanoparticles have an average particle size of less than about 100 nm, less than about 50 nm, less than about 40 nm, or less than about 30 nm. The silver particles can be uniformly distributed in the support. In an embodiment, the metallic nanoparticles are only dispersed at a surface of the support that directly contacts the fluid that contains dissolved oxygen. In another embodiment the metallic nanoparticles are dispersed throughout the support but the metallic particles have a higher concentration at the surface of the support that directly contacts the fluid that contains dissolved oxygen. Without wishing to be bound by theory, it is believed that when the fluid that contains dissolved oxygen comes into contact with the oxygen removal device, the metallic nanoparticles can serve as a catalyst to convert the dissolved oxygen in the fluid to hydroxy ions and the like.

The support can include carbon supports and metal oxide supports. Carbon supports include, but not limited to, activated carbon, carbon nanotubes including multiwalled and single walled carbon nanotubes, graphene, reduced graphene oxide, carbon fibers, or a combination comprising at least one of the foregoing. The metal oxide supports include, but not limited to, $TiO_2$, $WO_3$, $SiO_2$, $MnO_2$, $RuO_2$, $RhO_2$, or a combination comprising at least one of the foregoing. The loading level of the metallic nanoparticles in the support is about 0.1 wt % to about 70 wt %, about 1 wt % to about 50 wt % or about 5 wt % to about 10 wt %, based on the total weight of the cathode.

The cathode can have any shape or configuration, including bar, rod, mesh, curved, flat sheet and films. In an embodiment, the cathode has a thickness of about 0.1 cm to about 10 cm, a length of about 1 cm to about 200 cm, and a width of about 1 cm to about 150 cm.

Anode can include metals, metal oxides, metal borides, conductive polymers, semiconductors, ceramics, or a combination comprising at least one of the foregoing. Metals include titanium, iron, copper, platinum, nickel, zinc, tin, and stainless steel. Metal oxide includes manganese dioxide ($MnO_2$), copper (I) oxide (CuO), tungsten trioxide ($WO_3$), and noble metal oxides such as iridium oxide, tantalum oxide, ruthenium oxide including ruthenium (IV) dioxide ($RuO_2$), and rhodium oxide. Exemplary metal borides include titanium diboride ($TiB_2$), ruthenium boride ($RuB_2$), zirconium diboride ($ZrB_2$), nickel boride, or vanadium boride such as $V_2B_5$. A specific anode example is titanium coated with Pt, $IrO_2$, and/or $Ta_2O_5$.

The anode can have any shape or configuration, including bar, rod, mesh, curved, flat sheet and films. In an embodiment, the anode is a coating disposed on a surface of the tubular. The coating has a thickness of about 500 nm to about 500 microns. In another embodiment, the tubular itself is the anode.

The ion exchange membrane is operable to permit ions to pass between the cathode and the anode. The ion exchange membrane can be proton ($H^+$) conductive or —OH conductive. The order to ion conductivity is 0.001 S/cm to about 100 S/cm. In an embodiment, the ion exchange membrane can restrict the free-flow of non-ions, including water, dissolved salts, minerals and hydrocarbons, through the membrane.

The thickness of the membrane is about 50 microns to about 200 microns. The membrane can comprise polymers such as ionomers or polymer composites. Exemplary materials for the ion exchange membranes include polyaromatic polymers, fluoropolymers, ionomers, and the like. An ionomer is a polymer that comprises repeat units of both electrically neutral repeating units and a fraction of ionized units covalently bonded to the polymer backbone as pendent group moieties. Exemplary ionized units include, but are not limited to, carboxylic acid groups.

In an embodiment, the ion exchange membrane is a cation exchange membrane. A cation exchange membrane is an ion exchange membrane that only permits one-way ion communication, i.e., cations, between the anode and the cathode. Anions cannot pass through the cation exchange membrane. An example of a cation exchange membrane includes NAFION perfluorinated materials available from E. I du Pont de Nemours and Co.

In another embodiment, the ion exchange membrane is an anion exchange membrane. An anion exchange membrane is an ion exchange membrane that only permits one-way ion communication, i.e., anions, between the cathode and anode. Cations cannot pass through the anion exchange membrane. An example of an anion exchange membrane is an alkaline anion exchange membrane. In an embodiment, alkaline anion exchange membranes are made from ionomers. Anion exchange membranes can be particularly useful for removing dissolved oxygen in fluids having a pH of greater than 7.

The cathode and anode couple to and are in electrical communication with a power source. The power source is not particularly limited, and generally is effective to provide a voltage of about 0.010V to about 10V, specifically about 0.100V to about 5V to the anode and the cathode. In an embodiment, the current source is a battery.

The fluids that contains dissolved oxygen are not particularly limited. The fluids can have a pH of about 2 to 12 or about 8 to about 10. The oxygen removal device is compatible with fluids comprising brines. Exemplary brines include KCl, NaCl, $ZnCl_2$, $MgCl_2$, $CaCl_2$, NaBr, $ZnBr_2$, $NH_4Cl$, sodium formate, cesium formate, and the like. The concentration of the brines can be about 0.5 weight percent (wt %) to about 50 wt %, specifically about 1 wt % to about 40 wt %, and more specifically about 1 wt % to about 25 wt %, based on the weight of the fluid.

The inventors found that the oxygen removal device is particularly suitable to remove dissolved oxygen in drilling fluids and the completion fluids. The drilling fluids and completion fluids may be of any conventional type. Known additives can be included. Completion fluids are generally a solids-free liquid used to control a well and/or to help place certain completion-related equipment, such as gravel packs, without damaging the producing formation. Completion fluids include brines and other fluids having suitable density and flow characteristics. Drilling fluids aid the drilling of boreholes in to the earth. Exemplary drilling fluids include water-based mud, oil-based mud, and synthetic-based fluid.

The oxygen removal device is effective to remove dissolved oxygen in the fluid when the fluid flows through the oxygen removal device at various flow rates. In an embodiment, the flow rate is about 10 gallon/min to about 1,000 gallon/min or about 50 gallon/min to about 500 gallon/min.

Set forth are various embodiments of the disclosure.

Embodiment 1

A method of treating a fluid in a subterranean formation, the method comprising: injecting a fluid into a subterranean formation, the fluid containing dissolved oxygen; contacting the fluid with an oxygen removal device, the oxygen removal device comprising an anode, a cathode comprising metallic nanoparticles loaded on a support, an ion exchange membrane disposed between, and electrically separating the anode and the cathode, and a power source electrically coupled to the anode and the cathode; and reducing the amount of the dissolved oxygen in the fluid.

Embodiment 2

The method as in any prior embodiment, wherein the support comprises a carbon support or a metal oxide support or a combination thereof, the carbon support comprises activated carbon, carbon nanotubes, graphene, reduced graphene oxide, carbon fibers, or a combination comprising at least one of the foregoing, and the metal oxide support comprises $TiO_2$, $WO_3$, $SiO_2$, $MnO_2$, $RuO_2$, $RhO_2$, or a combination comprising at least one of the foregoing.

Embodiment 3

The method as in any prior embodiment, wherein the metallic nanoparticles comprise platinum, gold, copper, silver, tungsten carbide, titanium diboride, or a combination comprising at least one of the foregoing.

Embodiment 4

The method as in any prior embodiment, wherein the metallic nanoparticles have an average particle size of less than about 100 nm.

Embodiment 5

The method as in any prior embodiment, wherein the cathode comprises silver nanoparticles loaded on a carbon support.

Embodiment 6

The method as in any prior embodiment, wherein the metallic nanoparticles are located at a surface of the support that comes into direct with the fluid.

Embodiment 7

The method as in any prior embodiment, wherein the fluid is injected via a tubular. The oxygen removal device can be disposed on a surface of the tubular.

Embodiment 8

The method as in any prior embodiment, wherein the anode is the tubular. Alternatively, the anode is a coating disposed on a surface of the tubular; and the coating has a thickness of about 500 nm to about 500 microns.

Embodiment 9

The method as in any prior embodiment, wherein the anode comprises metals, metal oxides, metal borides, conductive polymers, semiconductors, ceramics, or a combination comprising at least one of the foregoing.

Embodiment 10

The method as in any prior embodiment, wherein the ion exchange membrane is a cation exchange membrane or an anion exchange membrane.

Embodiment 11

The method as in any prior embodiment, wherein the power source is a battery.

Embodiment 12

The method as in any prior embodiment, further comprising applying a voltage of about 0.1 V to about 5 V to the anode and the cathode.

Embodiment 13

The method as in any prior embodiment, wherein the fluid is a drilling fluid or a completion fluid.

Embodiment 14

The method as in any prior embodiment, wherein the fluid has a pH of about 2 to about 12.

Embodiment 15

The method as in any prior embodiment, wherein the fluid flows through the oxygen removal device at a flow rate of about 50 gallons/min to about 500 gallons/min.

Embodiment 16

The method as in any prior embodiment, wherein the amount of the dissolved oxygen is reduced after the fluid is flowed out of the tubular.

Embodiment 17

The method as in any prior embodiment, wherein the method comprises contacting the fluid with two or more oxygen removal devices disposed on an outer surface of the tubular.

Embodiment 18

A method of removing dissolved oxygen in a drilling or completion fluid, the method comprising: flowing the drilling or completion fluid through an oxygen removal device comprising an anode, a cathode comprising metallic nanoparticles loaded on a support, an ion exchange membrane disposed between, and electrically separating the cathode and the anode cathode, and a power source electrically coupled to the anode and the cathode.

Embodiment 19

The method as in any prior embodiment, wherein the dissolved oxygen is removed before the drilling or completion fluid is injected into a subterranean formation.

All ranges disclosed herein are inclusive of the endpoints, and the endpoints are independently combinable with each other. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity).

What is claimed is:

1. A method of treating a fluid in a subterranean formation, the method comprising:

injecting a fluid into a subterranean formation, the fluid containing dissolved oxygen;

contacting the fluid with an oxygen removal device in a downhole environment, the oxygen removal device comprising an anode, a cathode comprising metallic nanoparticles loaded on a support, an ion exchange membrane disposed between, and electrically separating the anode and the cathode, and a power source electrically coupled to the anode and the cathode;

wherein the oxygen removal device is disposed along a tubular, via which the fluid is injected into the subterranean formation; and reducing the amount of the dissolved oxygen in the fluid.

2. The method of claim 1, wherein the support comprises a carbon support or a metal oxide support or a combination thereof, the carbon support comprises activated carbon, carbon nanotubes, graphene, reduced graphene oxide, carbon fibers, or a combination comprising at least one of the foregoing, and the metal oxide support comprises $TiO_2$, $WO_3$, $SiO_2$, $MnO_2$, $RuO_2$, $RhO_2$, or a combination comprising at least one of the foregoing.

3. The method of claim 1, wherein the metallic nanoparticles comprise platinum, gold, copper, silver, tungsten carbide, titanium diboride, or a combination comprising at least one of the foregoing.

4. The method of claim 1, wherein the metallic nanoparticles have an average particle size of less than about 100 nm.

5. The method of claim 1, wherein the metallic nanoparticles are located at a surface of the support that comes into direct contact with the fluid.

6. The method of claim 1, wherein the cathode comprises silver nanoparticles loaded on a carbon support.

7. The method of claim 1, wherein the anode comprises metals, metal oxides, metal borides, conductive polymers, semiconductors, ceramics, or a combination comprising at least one of the foregoing.

8. The method of claim 1, wherein the ion exchange membrane is a cation exchange membrane.

9. The method of claim 1, wherein the ion exchange membrane is an anion exchange membrane.

10. The method of claim 1, wherein the power source is a battery.

11. The method of claim 1, further comprising applying a voltage of about 0.1 V to about 5 V to the anode and the cathode.

12. The method of claim 1, wherein the fluid is a drilling fluid or a completion fluid.

13. The method of claim 1, wherein the fluid has a pH of about 2 to about 12.

14. The method of claim 1, wherein the fluid flows through the oxygen removal device at a flow rate of about 50 gallons/min to about 500 gallons/min.

15. The method of claim 1, wherein the fluid is injected via a tubular.

16. The method of claim 15, wherein the oxygen removal device is disposed on a surface of the tubular.

17. The method of claim 15, wherein the anode is the tubular.

18. The method of claim 15, wherein the anode is a coating disposed on a surface of the tubular; and the coating has a thickness of about 500 nm to about 500 microns.

19. The method of claim 15, wherein the amount of the dissolved oxygen is reduced after the fluid is flowed out of the tubular.

20. The method of claim 15, wherein the method comprises contacting the fluid with two or more oxygen removal devices disposed on an outer surface of the tubular.

* * * * *